(12) United States Patent
Xu et al.

(10) Patent No.: US 10,605,087 B2
(45) Date of Patent: Mar. 31, 2020

(54) CMC COMPONENT WITH FLOWPATH SURFACE RIBS

(71) Applicant: United Technologies Corporation, Farmington, CT (US)

(72) Inventors: JinQuan Xu, East Greenwich, RI (US); Tracy A. Propheter-Hinckley, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 97 days.

(21) Appl. No.: 15/841,627

(22) Filed: Dec. 14, 2017

(65) Prior Publication Data

US 2019/0186271 A1    Jun. 20, 2019

(51) Int. Cl.
| | | |
|---|---|---|
| F01D 5/14 | (2006.01) | |
| F01D 5/28 | (2006.01) | |
| F01D 11/14 | (2006.01) | |
| F01D 11/08 | (2006.01) | |
| F01D 25/00 | (2006.01) | |

(52) U.S. Cl.
CPC ............. *F01D 5/145* (2013.01); *F01D 5/141* (2013.01); *F01D 5/142* (2013.01); *F01D 5/28* (2013.01); *F01D 5/282* (2013.01); *F01D 5/284* (2013.01); *F01D 11/08* (2013.01); *F01D 11/14* (2013.01); *F01D 25/005* (2013.01); *F05D 2220/323* (2013.01); *F05D 2230/20* (2013.01); *F05D 2230/90* (2013.01); *F05D 2240/11* (2013.01); *F05D 2240/305* (2013.01); *F05D 2260/97* (2013.01); *F05D 2300/222* (2013.01); *F05D 2300/603* (2013.01); *F05D 2300/6033* (2013.01); *F05D 2300/614* (2013.01)

(58) Field of Classification Search
CPC .......... F01D 5/141; F01D 5/145; F01D 5/147; F01D 5/282; F01D 11/08; F01D 25/005; F05D 2220/323; F05D 2300/614
USPC ........................................................ 415/173.1
See application file for complete search history.

(56) References Cited

U.S. PATENT DOCUMENTS

| | | | | |
|---|---|---|---|---|
| 1,022,203 A | * | 4/1912 | Nettle | F04D 29/30 |
| | | | | 416/236 R |
| 3,012,709 A | * | 12/1961 | Schnell | F04D 29/324 |
| | | | | 416/236 R |
| 3,193,185 A | * | 7/1965 | Erwin | F01D 5/145 |
| | | | | 415/193 |
| 3,706,512 A | * | 12/1972 | Strelshik | F04D 21/00 |
| | | | | 416/236 R |

(Continued)

FOREIGN PATENT DOCUMENTS

| | | | | | |
|---|---|---|---|---|---|
| DE | | 833100 C | * | 3/1952 | ........... F04D 29/681 |
| DE | | 2756880 A1 | * | 6/1978 | ........... F04D 29/547 |

(Continued)

OTHER PUBLICATIONS

DE_833100_-_English Translation (Year: 1952).*

(Continued)

*Primary Examiner* — Woody A Lee, Jr.
*Assistant Examiner* — Brian Christopher Delrue
(74) *Attorney, Agent, or Firm* — Bachman & LaPointe, P.C.

(57) ABSTRACT

A turbomachine airfoil element has a substrate. The substrate defines an airfoil having a pressure side and a suction side. A plurality of fiber composite ribs are along the pressure side.

18 Claims, 7 Drawing Sheets

(56) References Cited

U.S. PATENT DOCUMENTS

| | | | | |
|---|---|---|---|---|
| 4,108,573 | A * | 8/1978 | Wagner | F01D 5/141 416/236 A |
| 4,128,363 | A * | 12/1978 | Fujikake | F01D 5/145 416/175 |
| 4,222,710 | A * | 9/1980 | Katagiri | F04D 29/38 123/41.49 |
| 4,466,772 | A * | 8/1984 | Okapuu | F01D 11/08 415/171.1 |
| 5,368,508 | A * | 11/1994 | Whittington | B63H 1/26 416/236 A |
| 5,525,038 | A * | 6/1996 | Sharma | F01D 5/141 416/223 A |
| 6,284,390 | B1 * | 9/2001 | Bose | C23C 28/3215 416/241 B |
| 6,589,600 | B1 * | 7/2003 | Hasz | B22C 9/10 427/264 |
| 6,612,808 | B2 * | 9/2003 | Lee | F01D 5/187 415/175 |
| 6,654,710 | B1 * | 11/2003 | Keller | G06F 17/50 703/1 |
| 7,153,096 | B2 * | 12/2006 | Thompson | F01D 5/147 415/200 |
| 7,438,518 | B2 * | 10/2008 | Self | F01D 5/147 415/115 |
| 7,600,968 | B2 * | 10/2009 | Nelson | F01D 11/122 415/173.4 |
| 8,939,705 | B1 * | 1/2015 | Lee | F01D 11/122 415/1 |
| 9,091,176 | B2 * | 7/2015 | Martin | F01D 5/186 |
| 9,109,452 | B2 * | 8/2015 | Martin | F01D 5/186 |
| 9,228,445 | B2 * | 1/2016 | Darkins, Jr. | F01D 5/147 |
| 9,777,635 | B2 * | 10/2017 | Bergholz | F02C 7/18 |
| 2005/0091848 | A1 * | 5/2005 | Nenov | B23P 6/005 29/889.1 |
| 2006/0280952 | A1 * | 12/2006 | Hazel | C04B 41/009 428/446 |
| 2008/0181766 | A1 * | 7/2008 | Campbell | F01D 5/14 415/116 |
| 2009/0220346 | A1 * | 9/2009 | Schluter | F04D 29/284 416/223 A |
| 2010/0189556 | A1 * | 7/2010 | Propheter-Hinckley | F01D 5/284 415/200 |
| 2011/0262705 | A1 * | 10/2011 | Gupta | B64C 21/10 428/156 |
| 2012/0313291 | A1 * | 12/2012 | Stege | B29C 70/74 264/259 |
| 2016/0052621 | A1 * | 2/2016 | Ireland | B64C 21/04 137/13 |
| 2016/0123345 | A1 * | 5/2016 | Scotti Del Greco | F04D 29/30 415/208.1 |
| 2016/0215645 | A1 * | 7/2016 | McCaffrey | F01D 25/246 |
| 2017/0234134 | A1 * | 8/2017 | Bunker | F04D 29/681 415/208.2 |
| 2017/0314785 | A1 * | 11/2017 | Vargas | F01D 11/08 |

FOREIGN PATENT DOCUMENTS

| | | | |
|---|---|---|---|
| EP | 3244029 A1 | 11/2017 | |
| WO | WO-9205341 A1 * | 4/1992 | ........... F03D 1/0608 |
| WO | 2015/130519 A1 | 9/2015 | |

OTHER PUBLICATIONS

Chelsey Levingston, GE Aviation to Introduce Advanced Composite Materials on Jet Engines, Mar. 3, 2015, Dayton Daily News, Dayton, Ohio.

European Search Report dated May 24, 2019 for European Patent Application No. 18212690.4.

\* cited by examiner

CMC COMPONENT WITH FLOWPATH SURFACE RIBS

BACKGROUND

The disclosure relates to turbomachinery. More particularly, the disclosure relates to ceramic and ceramic matrix composite (CMC) components along the gaspath of turbine sections of such turbomachinery.

CMC has been proposed for wide use in hot sections of gas turbine engines (broadly inclusive of engines used in propulsion via thrust, other propulsive engines, industrial gas turbines, and the like). Particular structures proposed for CMC use include turbine blades and vanes (e.g., United States Patent Application Publication 20100189556A1, Propheter-Hinckley et al., Jul. 29, 2010, "Segmented Ceramic Matrix Composite Turbine Airfoil Component"), combustor components (e.g., United States Patent Application Publication 20170314785A1, Vargas, Nov. 2, 2017, "Ceramic and Ceramic Matrix Composite Attachment Methods and Systems"), and blade outer air seals (BOAS) (e.g., United States Patent Application Publication 20160215645A1, McCaffrey, Jul. 28, 2016, "Blade Outer Air Seal Made of Ceramic Matrix Composite").

U.S. patent application Ser. No. 15/354,083, Propheter-Hinckley et al., Nov. 17, 2016, "Article Having Ceramic Wall with Flow Turbulators", (the '083 application), the disclosure of which is incorporated by reference herein as if set forth at length, discloses CMC structures having flow turbulators. For example, an internally-cooled vane is illustrated wherein the CMC forms turbulators as ribs transverse to the cooling flow.

Separately, in the field of metallic blades, U.S. Pat. No. 9,109,452, Martin et al., Aug. 18, 2015, "Vortex generators for improved film effectiveness" discloses ribs along the exterior surface of a blade airfoil interfacing with cooling air from film cooling holes. United States Patent Application Publication 20170234134A1, Bunker, Aug. 17, 2017, "Riblets for a Flowpath Surface of a Turbomachine", also discloses airfoil surface features.

Also, in the field of blade outer air seals (BOAS), U.S. Pat. No. 7,600,968, Nelson et al., Oct. 13, 2009, "Pattern for the Surface of a Turbine Shroud" discloses various patterns of ribs along the inner diameter (ID) surface of a BOAS.

SUMMARY

One aspect of the disclosure involves a turbomachine airfoil element comprising: a substrate defining an airfoil having a pressure side and a suction side; and a plurality of fiber composite ribs along the pressure side.

A further embodiment of any of the foregoing embodiments may additionally and/or alternatively include the turbomachine airfoil element being a blade having a free tip.

A further embodiment of any of the foregoing embodiments may additionally and/or alternatively include the ribs shifting tipward from upstream to downstream.

A further embodiment of any of the foregoing embodiments may additionally and/or alternatively include the ribs converging toward each other from upstream to downstream.

A further embodiment of any of the foregoing embodiments may additionally and/or alternatively include the ribs comprising a plurality of short ribs alternating with a plurality of long ribs.

A further embodiment of any of the foregoing embodiments may additionally and/or alternatively include the ribs shifting tipward from upstream to downstream.

A further embodiment of any of the foregoing embodiments may additionally and/or alternatively include the ribs being only along an outboard half of the pressure side.

A further embodiment of any of the foregoing embodiments may additionally and/or alternatively include the turbomachine airfoil element being non-hollow.

A further embodiment of any of the foregoing embodiments may additionally and/or alternatively include the turbomachine airfoil element lacking internal cooling passageways.

A further embodiment of any of the foregoing embodiments may additionally and/or alternatively include the turbomachine airfoil element lacking film cooling holes adjacent the plurality of ribs.

A further embodiment of any of the foregoing embodiments may additionally and/or alternatively include each rib comprising a stack of tapes, the tapes each comprising a plurality of fiber bundles.

A further embodiment of any of the foregoing embodiments may additionally and/or alternatively include the fiber composite ribs being ceramic matrix composite (CMC).

A further embodiment of any of the foregoing embodiments may additionally and/or alternatively include the substrate comprising a CMC.

A further embodiment of any of the foregoing embodiments may additionally and/or alternatively include the CMC of the substrate and the CMC of the ribs each comprising: a silicon-based matrix; and silicon-based fibers embedded in the matrix.

A further embodiment of any of the foregoing embodiments may additionally and/or alternatively include the CMC comprising: a silicon-based matrix; and silicon-based fibers embedded in the matrix.

A further embodiment of any of the foregoing embodiments may additionally and/or alternatively include a coating over the ribs and extending beyond the ribs.

A further embodiment of any of the foregoing embodiments may additionally and/or alternatively include a turbomachine including a stage of the turbomachine airfoil elements, the turbomachine airfoil elements being blades, and the turbomachine further comprising a blade outer airseal adjacent tips of the blades.

A further embodiment of any of the foregoing embodiments may additionally and/or alternatively include a method for using the turbomachine airfoil element. The method comprises: running a stage of said airfoil elements forming a blade stage; and the ribs diverting gas flow along the pressure sides relatively toward the respective trailing edges and away from the respective tips.

Another aspect of the disclosure involves a gas turbine engine comprising: a gaspath, a component along the gaspath comprising: a substrate; and a plurality of fiber composite ribs along the gaspath.

A further embodiment of any of the foregoing embodiments may additionally and/or alternatively include the component being a blade outer airseal and the ribs being along an ID face of the substrate.

Another aspect of the disclosure involves a method for guiding gas flow along a surface of a component of a turbomachine, the method comprising: providing a plurality of fiber composite ribs along the surface parallel to a desired direction of the gas flow.

The details of one or more embodiments are set forth in the accompanying drawings and the description below.

Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
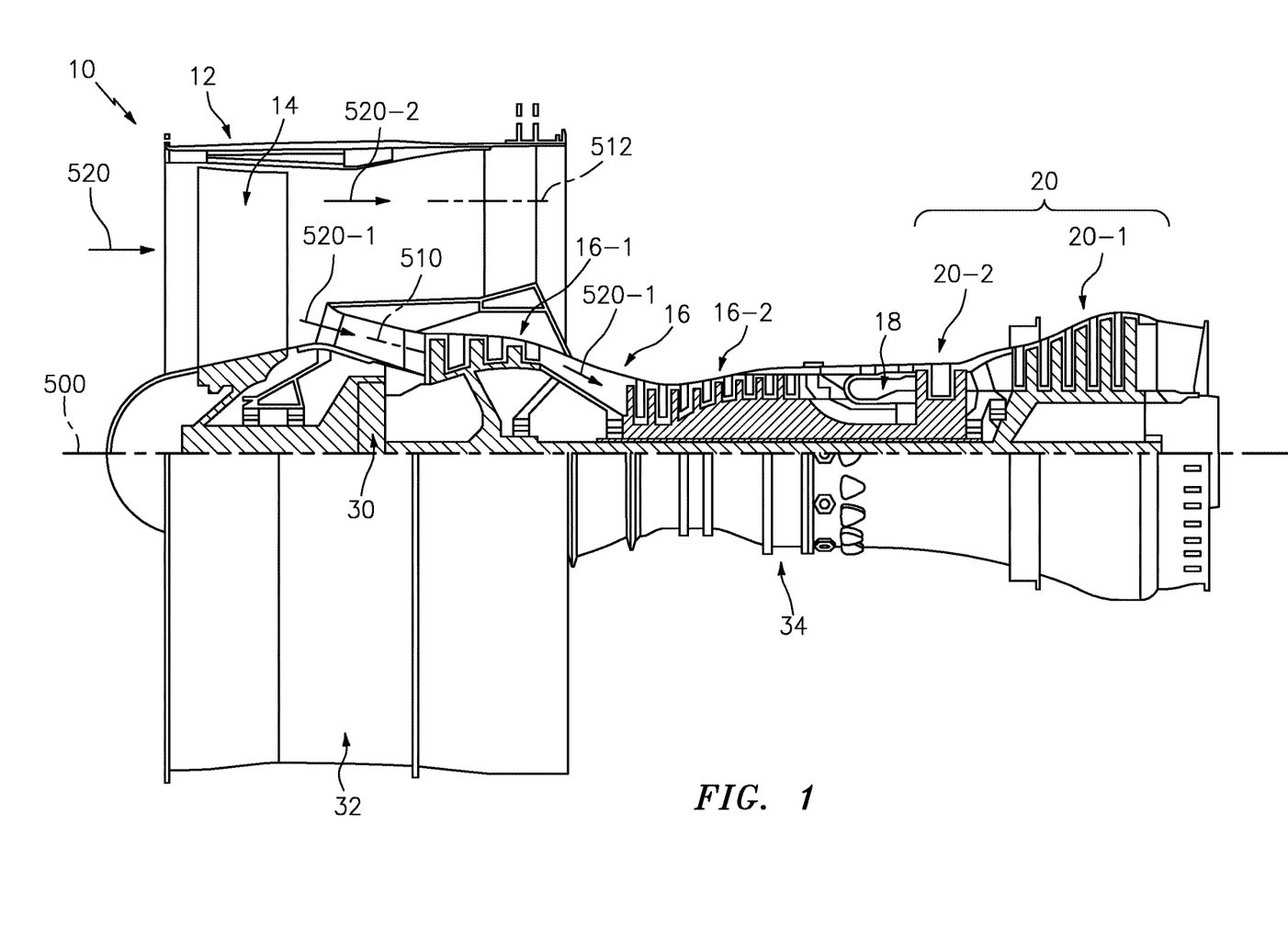
FIG. 1 is a partially schematic half-sectional (central longitudinal) view of a gas turbine engine.

FIG. 1 is a schematic illustration of a gas turbine engine 10. The illustrated engine is a turbofan used to produce propulsive thrust in aerospace applications. Broadly, relevant gas turbine engines may also include turbojets, turboprops, turboshafts, industrial gas turbines (IGT), and the like. For purposes of illustration, outer aerodynamic cases are not shown. The gas turbine engine has a central longitudinal axis 500. The gas turbine engine generally has a fan section 12 through which an inlet flow 520 of ambient air is propelled by a fan 14, a compressor 16 for pressurizing the air 520-1 received from the fan 14, and a combustor 18 wherein the compressed air is mixed with fuel and ignited for generating combustion gases. The inlet flow 520 splits into a first or core portion 520-1 flowing along the gaspath (core flowpath) 510 and a bypass portion 520-2 flowing along a bypass flowpath 512. The illustrated engine 10 and gross features are based on a particular configuration. Nevertheless, the teachings herein may be applied to other general engine configurations and other particular component configurations.

The gas turbine engine 10 further comprises a turbine 20 for extracting energy from the combustion gases. Fuel is injected into the combustor 18 of the gas turbine engine 10 for mixing with the compressed air from the compressor 16 and ignition of the resultant mixture. The fan 14, compressor 16, combustor 18, and turbine 20 are typically all concentric about a central longitudinal axis 500 of the gas turbine engine 10.

Depending upon the implementation, the compressor and turbine may each contain multiple sections. Each section includes one or more stages of rotor blades interspersed with one or more stages of stator vanes. The exemplary configuration has two compressor sections and two turbine sections. From upstream to downstream along the gaspath 510, these include a low pressure compressor section (LPC) 16-1, a high pressure compressor section (HPC) 16-2, a high pressure turbine section (HPT) 20-2, and a low pressure turbine section (LPT) 20-1. The exemplary rotors of the LPC and LPT are formed to rotate as a first unit or low pressure spool with the LPT driving the LPC. Similarly, the HPT and HPC rotors are arranged as a high pressure spool. The fan may be driven by the low pressure spool either directly or via a reduction gearbox 30. Other configurations are, however, known.

The exemplary engine comprises a fan case 32 and a core case 34. The core case has sections along the corresponding sections of the engine core (e.g. an LPC case section, an HPC case section, a HPT case section, and an LPT case section).

Each of the LPC, HPC, HPT, and LPT sections has several stages of blades of the associated rotor. Interspersed with the blades are stages of stator vanes.

Figure 5:
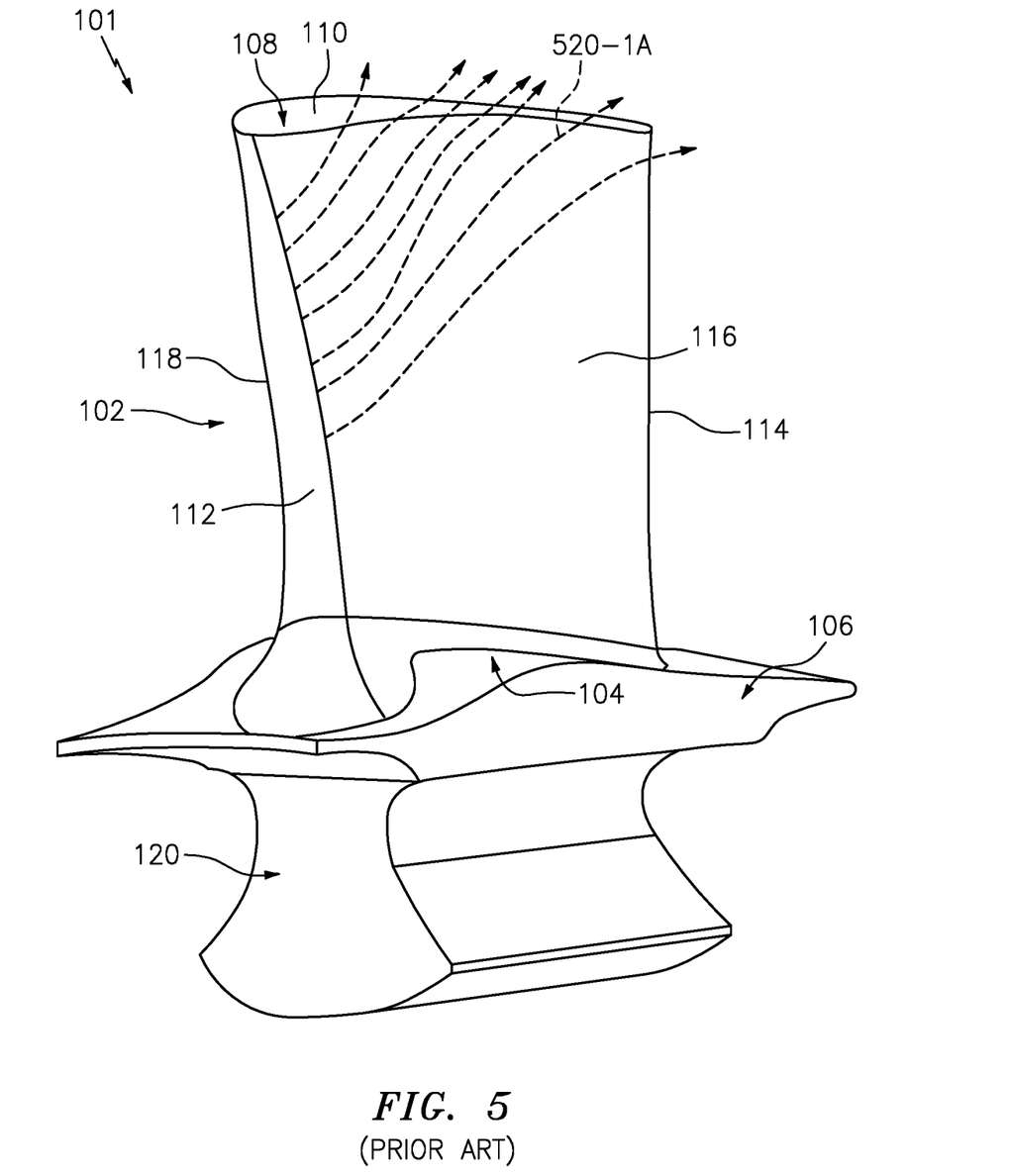
FIG. 5 is a view of a prior art blade.

FIG. 5 shows a prior art CMC (e.g., silicon carbide fibers in silicon carbide matrix) turbine blade 101 having an airfoil 102 extending from an inboard end 104 at a platform 106 to an outboard end 108 at a tip 110. The airfoil exterior (gaspath-facing) surface extends from an upstream leading edge 112 to a downstream trailing edge 114 and has a pressure side 116 and a suction side 118. A protuberant attachment root 120 depends from the underside of the platform 106 for attaching the blade to a disk. Alternative blade configurations are integrally formed with the disk (integrally bladed rotors (IBR) or blisks). The exemplary blade lacks internal cooling air passages, generally, and film cooling holes to the airfoil surface, particularly. This highlights one potential are of advantage of CMC blades relative to metallic blades. Use of cooling air creates several inefficiencies. First, it cools and dilutes the combustion gases, thereby reducing the amount of energy that could be extracted by the turbine. Second, diversion of cooling air reduces the amount of air that could be driven through the bypass flowpath, thereby further reducing thrust. Nevertheless, the blades may have internal cooling passages and there may be film cooling.

In one particular group of examples, the film cooling holes could be positioned between the ribs. This may counter vortex formation.

In operation, as the blade rotates, the centrifugal action causes the gas flow 520-1A (a portion of the core flow 520-1) along the pressure side to radially outwardly diverge and form a leakage flow over the tip toward the suction side (e.g., between the tip and a blade outer air seal (BOAS)). This reduces efficiency of energy extraction from the gas.

Figure 2:
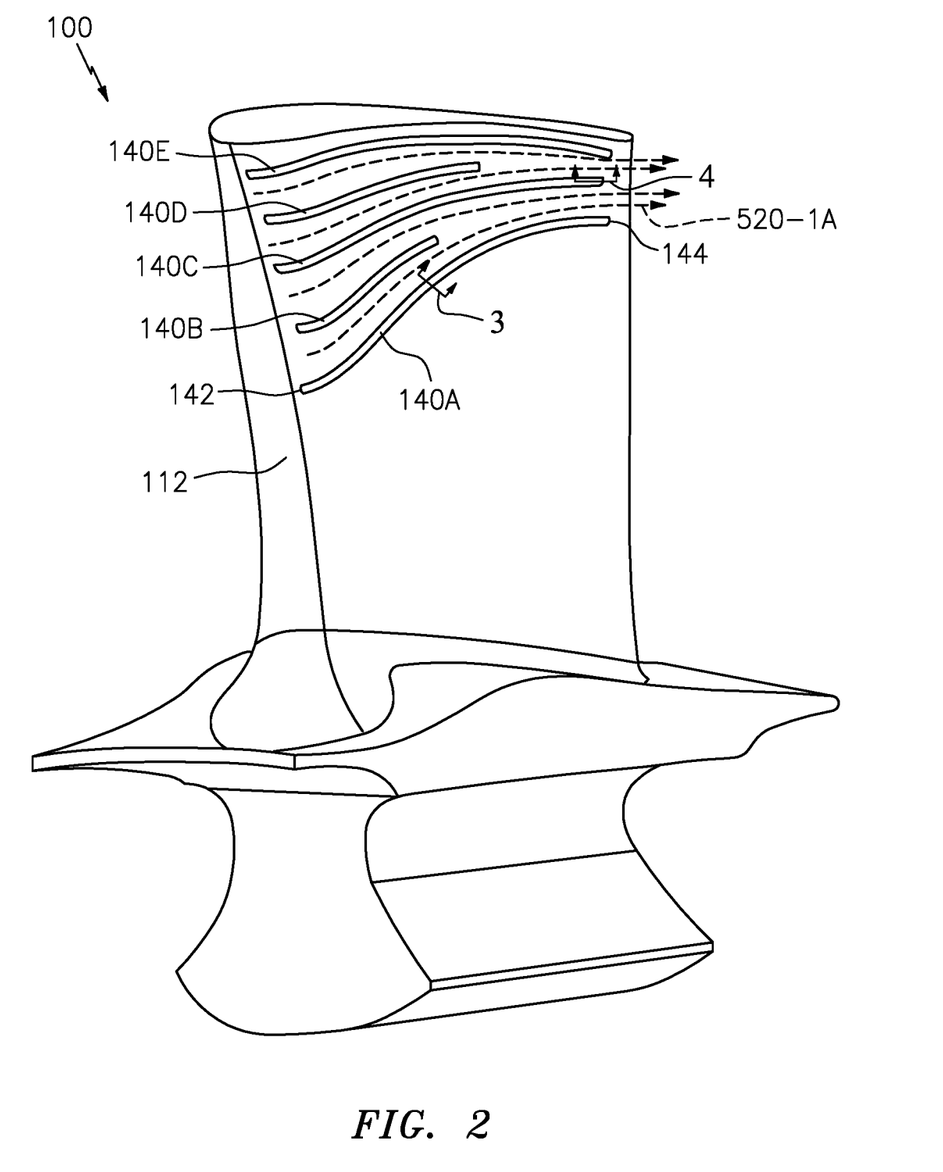
FIG. 2 is a view of a blade of the engine.

FIG. 2 shows a modified blade 100 having a radially or spanwise arrayed plurality of surface ribs 140A, 140B, 140C, 140D, 140E (collectively 140). Each rib extends from a leading/upstream end 142 to a trailing/downstream end 144. The leading ends are all close to the leading edge 112 (e.g., within 10% of the local distance along the pressure side from the leading edge to the trailing edge). The ribs are oriented to guide the gas flow 520-1A to reduce or minimize leakage over the tip. The spanwise spacing between any given two ribs generally converges from upstream to downstream. Given this convergence, the exemplary embodiment has alternating essentially full length ribs 140A, 140C, and 140E with their downstream ends 144 relatively near the trailing edge (e.g., within 10% as described for the leading ends 142 relative to the airfoil leading edge) and shorter ribs 140B and 140D (e.g., with their ends 144 terminating well short of the trailing edge (e.g., at least 25% or 35% shy of the trailing edge)). This alternating/interdigitated arrangement of ribs allows for sufficient density of ribs near the leading edge to provide a desired guidance of the flow while not interfering with that flow guidance near the trailing edge. For example, if the density got too high near the trailing edge, the flow would tend to merely pass over the ribs. Near the tip, the ribs are close to parallel to the tip. Near the root, the ribs radially diverge toward the tip from upstream to downstream. The use of alternating shorter ribs also reduces rotating mass relative to hypothetical use of only full-length ribs.

In further variations, the ribs may have non-uniform cross-section between the leading/upstream end 142 and the trailing/downstream end 144. For example, a cross-section near the leading/upstream end 142 may be greater than that near the trailing/downstream end 144 (e.g., wider or taller). The greater cross-section upstream may allow for greater flow turning and handling greater stresses. The taper downstream may be for aerodynamic purposes such as avoiding vortex formation.

In yet further variations, the leading end of the ribs may be aerodynamically shaped for minimizing losses.

The exemplary ribs are located along an outboard portion of the airfoil (e.g., along an outboard half). This may have several advantages. First, is simple reduction of cost relative to having ribs along the entire span. Second, is it limits risk of creating turbulence along the inboard portion of the airfoil (whereas turbulence may otherwise be present near the tip). Also, the added rotating weight of ribs on the inboard portion is avoided. However, in further variations, the ribs can be located along an inboard portion and/or along a platform surface.

As is noted above, the illustrated example lacks any surface film cooling holes. Thus, unlike certain metallic blades, the surface ribs in the example are not associated with any discharge from film cooling holes. Nevertheless, this does not preclude the ribs being used on film-cooled embodiments.

Figure 3:
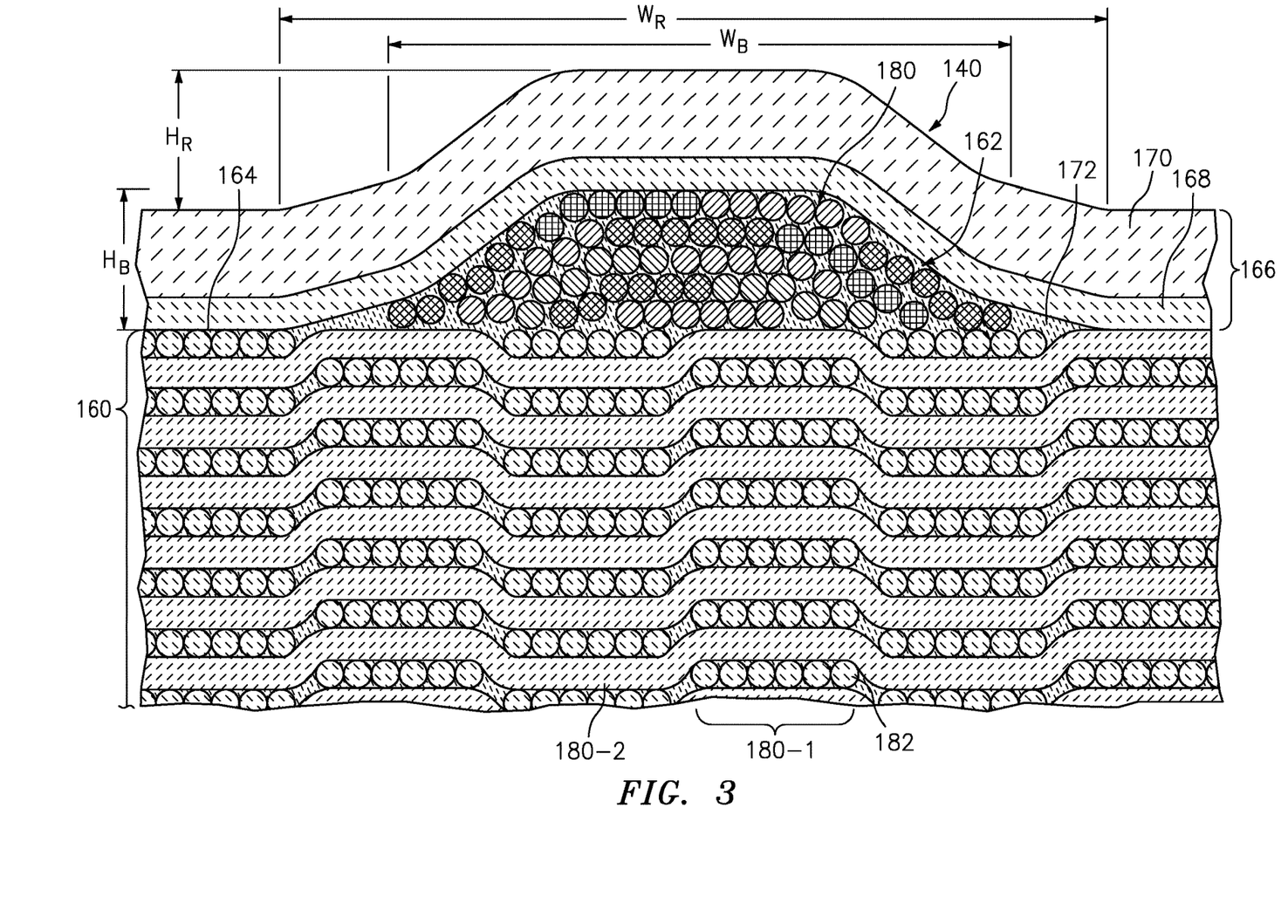
FIG. 3 is a partial sectional view of a pressure side wall of the blade taken transverse to a surface rib.

FIG. 3 is a partial sectional view of the airfoil taken transverse to a rib 140. This shows the blade along the airfoil as comprising a CMC substrate 160 of a main body of the airfoil; a core substrate 162 of the rib atop a surface 164 of the substrate 160, and a coating 166. The exemplary coating is a two layer coating having first layer 168 and a second layer 170. An exemplary second layer is an environmental barrier coating (EBC—typically a ceramic) and an exemplary first layer is a bond coat to improve adhesion of the EBC to the CMC substrate.

Exemplary EBC and bond coats are disclosed in United States Patent Application Publication 20060280952A1 (the '952 publication), of Hazel et al., published Dec. 14, 2006, and entitled "Bond coat for corrosion resistant EBC for silicon-containing substrate and processes for preparing same". The '952 publication discloses silicon-containing bond coats and silicide-containing bond coats. An exemplary bond coat is applied by spray or vapor deposition. Exemplary silicon, silicate, or silica bond coats may comprise one or more layers formed from rare earth silicates such as a mullite layer, a mullite-alkaline earth aluminosilicate mixture layer, an yttrium monosilicate layer, an ytterbium doped yttrium disilicate layer, a barium strontium aluminosilicate layer, and the like. The application technique may tailored so that at the edges of the ribs there is a sufficiently gradual transition to prevent EBC spallation while still having a desired flow redirection. One approach is to have a thick bond coat for improved elasticity. An exemplary EBC is one or more ceramic layers such as stabilized zirconias or alumina, applied by spray or vapor deposition.

The exemplary configuration forms the CMC substrate of interwoven tapes 180 of fiber (e.g., ceramic) bundles 182. The exemplary schematic illustration has six fiber bundles per tape. For purposes of illustration, these are shown in a simple weave of tapes 180-1 and 180-2 in respective alternating orthogonal directions. FIG. 3 also shows a ceramic matrix 172 encapsulating the fibers of the substrate and rib.

The exemplary rib is also made out of similar tapes 180. For purposes of illustration of the interlayering of tapes, each tape is shown with distinct hatching. The exemplary lay-up includes a single central tape. Two tapes form a layer on top and then progressively more tapes form further layers. This allows the size of the rib to gradually taper.

Figure 4:
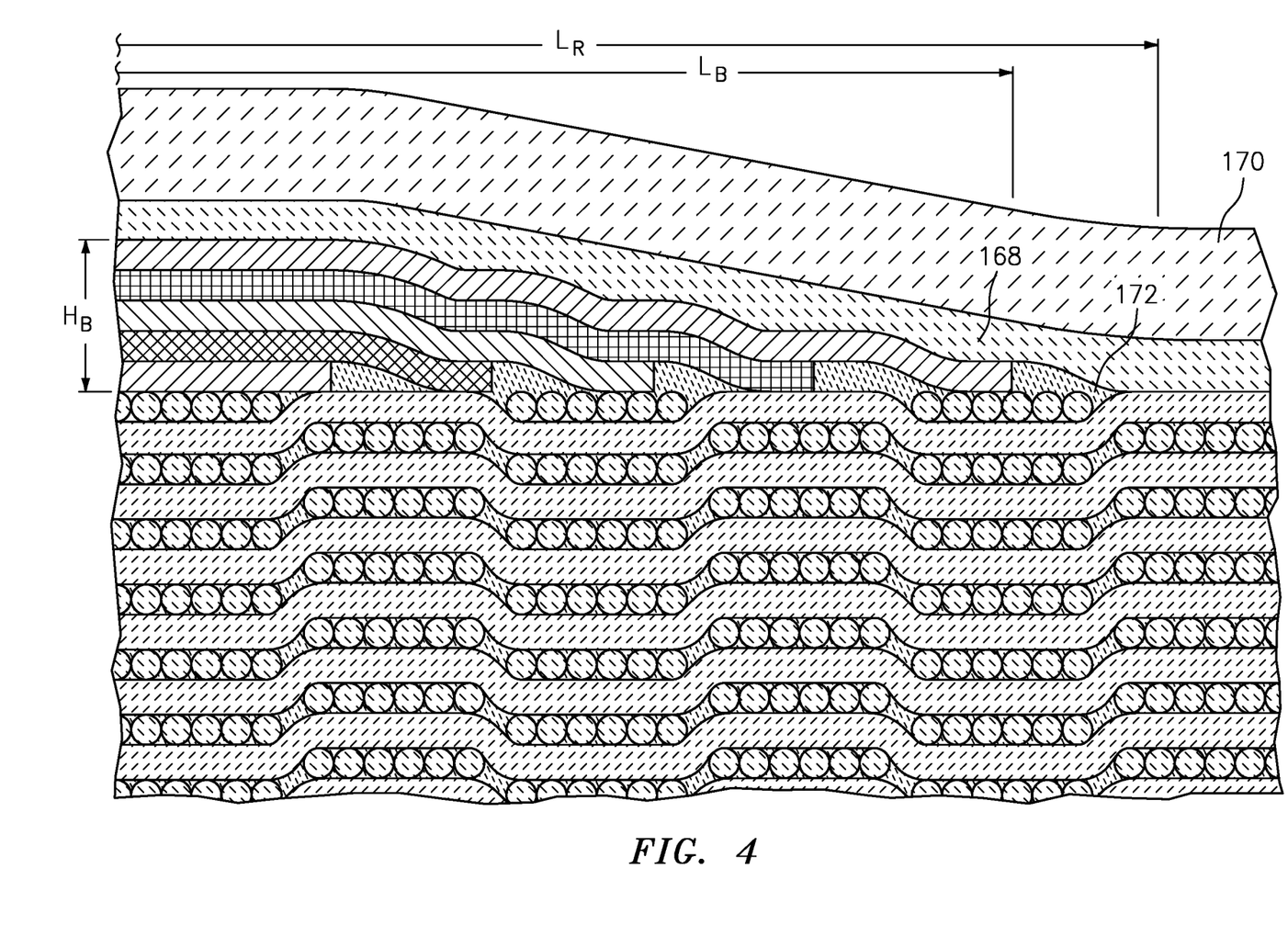
FIG. 4 is a partial sectional view of a pressure side wall of the blade taken along a surface rib.

FIG. 4 shows one of the ends 142 or 144. In this example, the tapes 180 are progressively longer from the base layer outward. This provides a gradual taper at the ends. The side and end tapers avoid sharp corners that would produce notch stress in the coating 166.

In terms of exemplary dimensions, FIG. 3 shows exemplary rib heights HR and widths WR as projected through the coating. Alternative dimensional characterizations may involve the height and width of the CMC substrate (e.g., all the bundles that form the rib such as those that are not part of the normal weave or other layup of the blade substrate). These height and width dimensions are shown as HB and WB. With a relatively even coating thickness, HB and HR will be about the same but WB will be smaller than WR. Exemplary rib heights HR are 0.005 inch to 0.020 inch (0.13 millimeter to 0.51 millimeter), more narrowly 0.20 millimeter to 0.40 millimeter for typical sizes of aero engines or in the range of 0.20 millimeter to 1.2 millimeter for industrial gas turbines. Exemplary WB is 0.005 inch to 0.015 inch (0.13 millimeter to 0.38 millimeter), more broadly 0.13 millimeter to 0.50 millimeter for aero engines with 0.13 millimeter to 3.0 millimeter for industrial gas turbines. Exemplary WR is 1.25 to 2.0 times WB, more broadly 1.0 to 5.0. Rib length may similarly be measured with terminal locations for lengths LR and LB shown in FIG. 4.

An exemplary process of engineering the blade may start from a baseline blade without ribs. It may include an iterative computational fluid dynamics (CFD) simulation. There are a broad range of options for which parameters of the optimization are fixed to begin with and which are varied/optimized. Such options may reflect designer experience. These parameters include the height and width of ribs, the streamwise locations at which they begin and end, the portion of the airfoil along which they are arranged, and the amount of redirection of the flow.

In one example only the amount of redirection is optimized. Consider that ribs parallel to the core flowpath (e.g., a rib that starts and ends at X % of the local airfoil span) may represent too much redirection and produces turbulence/losses. The simulation may work from that value toward stability or from the baseline toward that. Assume that the baseline (ribless) simulation has a streamline that starts at 70% span at the leading edge just leaking over the tip at the trailing edge. One might start the simulation with an increment such that a rib at 70% span near the leading edge is directed toward a 90% span location at the trailing edge. The rib may continuously progressively diverge from the baseline streamline. For purposes of example, it is assumed that the rib density is initially set (either in absolute terms (e.g. ribs starting every 3.0 millimeter of span from 60% span outward) relative terms (e.g. ribs starting every 4% of span from 60% span outward)). Iterations may increase the amount of redirection until negative returns (e.g., turbulence above a tolerable threshold is observed) are encountered. The may be a zeroing in in terms of changing the increment and/or backing off to find an optimum. Other parameters may similarly be iteratively optimized.

Thus, an exemplary process of manufacture may be implemented as a modification of a baseline process (e.g., see the '083 application) for manufacturing a baseline component (i.e., one without the subject ribs but which is to be replaced by the modified component having the ribs). Some processes may involve forming the ribs as part of the basic structure of the substrate (e.g., wherein the rib tapes or individual bundles become interwoven with the rest of the substrate). Others involve separate application. One group of separate application techniques involves essentially laying up the fibers of the substrate and then applying the fibers of the ribs. This may be done before matrix infiltration of the substrate or after infiltration of the substrate. In the latter situation, the tapes or bundles of the ribs could be pre-infiltrated with matrix material or a separate subsequent infiltration step could occur. Another possible process involves modifying the die/mold used for the substrate layup to include grooves corresponding to the ribs. The rib bundles or tapes could then be inserted into the grooves and then the substrate laid-up as in the baseline.

Thus, one particular example of a process may involve lay-up of the fiber bundles/tapes in a die. The matrix is then infiltrated into the lay-up (e.g., via melt infiltration). After solidification (e.g., cooling), there may be a machining and then coating.

Figure 6:
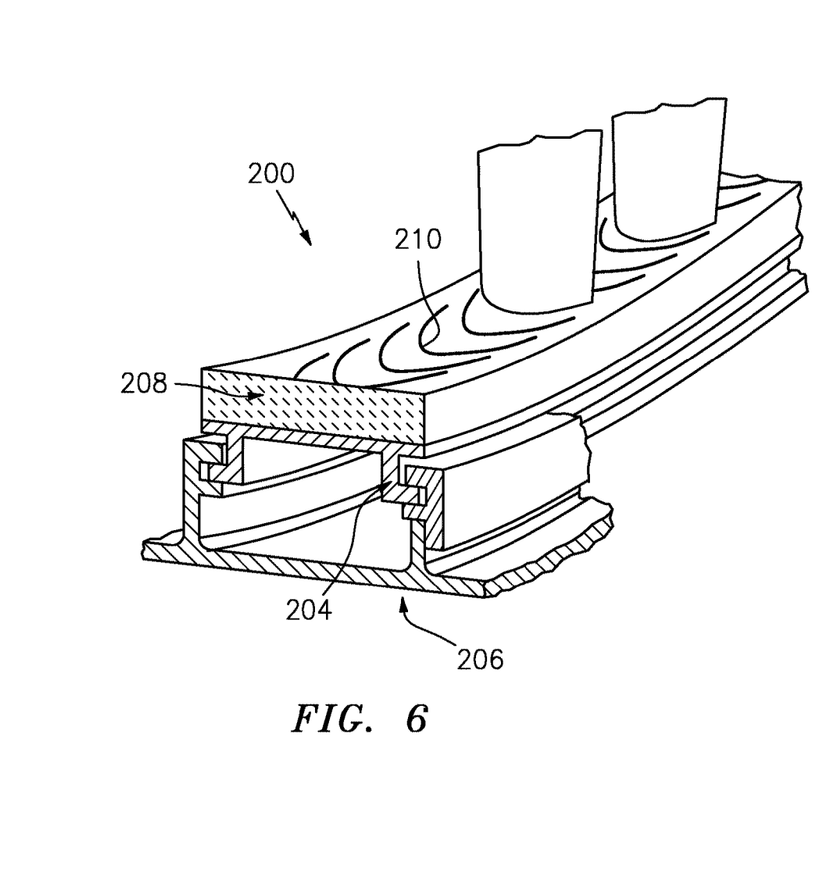
FIG. 6 is a partial view of a ribbed blade outer airseal (BOAS) showing sweep by two blade airfoils of a stage of blades.

FIG. 6 shows a BOAS 200. The exemplary BOAS is circumferentially segmented. Each segment has a substrate 204 (e.g., metallic, ceramic, or hybrid metallic/ceramic) with mounting features for mounting to a case 206. A ceramic layer 208 atop the substrate may be formed by monolithic ceramic or CMC. CMC ribs 210 may be formed similarly to the blade CMC ribs.

Figure 7:
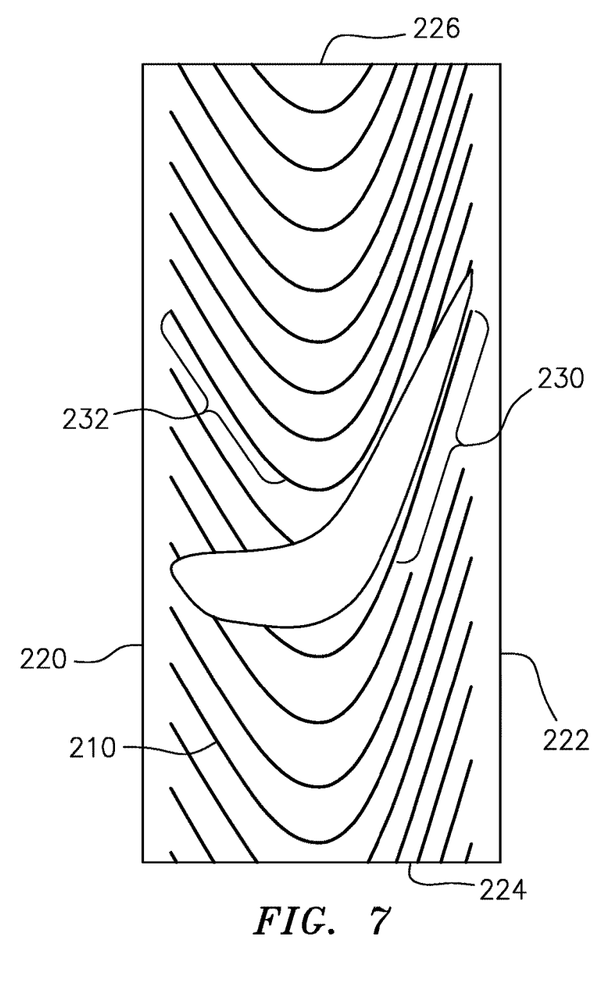
FIG. 7 is a schematic view of the relationship between blade airfoils and pattern of BOAS ribs for the BOAS of FIG. 6.

The exemplary BOAS segment has a forward/upstream/leading end 220 and an aft/downstream/trailing end 222 and first 224 and second 226 circumferential ends (FIG. 7). FIG. 7 shows the footprint of the airfoil at the tip. Exemplary rib planform bears a relationship to the airfoil tip footprint. In a region 230 near the trailing end, swept by a trailing portion of the airfoil tip footprint, the rib planform is generally close to an orientation of the suction side of the footprint. This may streamline gas flow along the tip for vortex reduction near the airfoil trailing portion. However, in a region 232 near the leading end, the shaped to minimize airfoil turning loss. In other variations, the leading end may be curved more aggressively.

Figure 8:
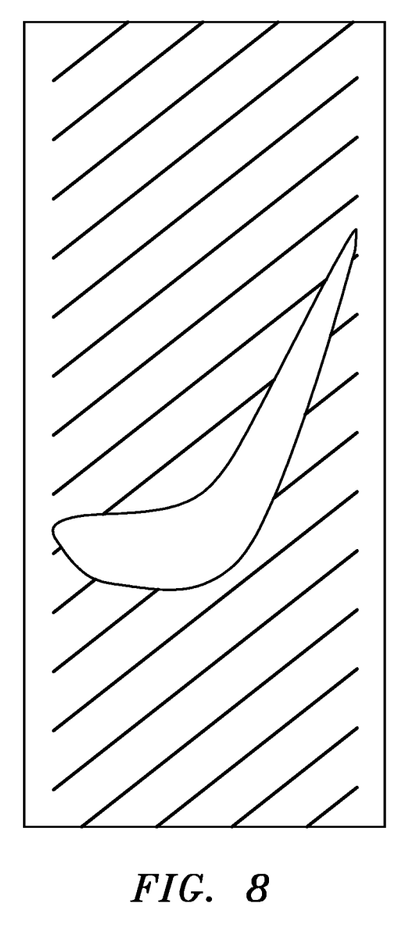
FIG. 8 is a schematic view of the relationship between blade airfoils and an alternate pattern of BOAS ribs.

FIG. 8 shows an alternate pattern where the ribs are essentially diagonal or helical in the same direction off axial as is the footprint chord. In this example, the diagonal/spiral form balances cost and ease of manufacture against aerodynamic performance.

Figure 9:
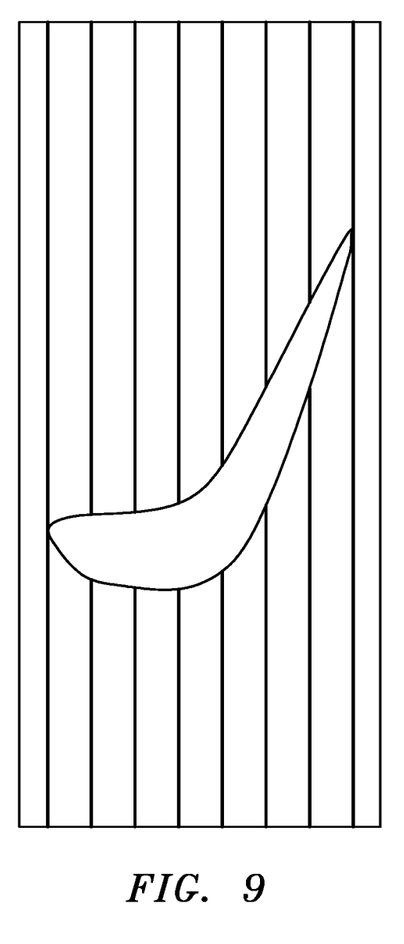
FIG. 9 is a schematic view of the relationship between blade airfoils and an alternate pattern of BOAS ribs.

FIG. 9 shows an alternate pattern where the ribs are circumferential. In this example, ease and low cost of manufacture may be favored over aerodynamic performance.

In further variations, the CMC ribs may be atop a monolithic ceramic (or a randomly filled/reinforced ceramic) instead of a CMC. Other fiber composite (fibers in matrix) variations involve use of organic matrix composite (OMC) substrates and ribs.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbomachine airfoil element comprising: a substrate defining an airfoil having a pressure side and a suction side; and a plurality of fiber composite ribs along the pressure side, wherein the ribs comprise a plurality of short ribs alternating with a plurality of long ribs, the long ribs having respective trailing ends closer to the trailing edge than are trailing ends of the short ribs.

2. The turbomachine airfoil element of claim 1 wherein the turbomachine airfoil element is a blade having a free tip.

3. The turbomachine airfoil element of claim 2 wherein: the ribs shift tipward from upstream to downstream.

4. The turbomachine airfoil element of claim 1, wherein the ribs converge toward adjacent ribs of the plurality of ribs from upstream to downstream.

5. The turbomachine airfoil element of claim 1 wherein: the ribs comprise a plurality of short ribs alternating with a plurality of long ribs.

6. The turbomachine airfoil element of claim 1 wherein: the ribs shift tipward from upstream to downstream.

7. The turbomachine airfoil element of claim 1 wherein: the ribs are only along an outboard half of the pressure side.

8. The turbomachine airfoil element of claim 1 wherein the turbomachine airfoil element is non-hollow.

9. The turbomachine airfoil element of claim 1 wherein: the turbomachine airfoil element lacks internal cooling passageways.

10. The turbomachine airfoil element of claim 1 wherein: the turbomachine airfoil element lacks film cooling holes adjacent the plurality of ribs.

11. The turbomachine airfoil element of claim 1 wherein: each rib comprises a stack of tapes, the tapes each comprising a plurality of fiber bundles.

12. The turbomachine airfoil element of claim 1 wherein: the fiber composite ribs are ceramic matrix composite (CMC).

13. The turbomachine airfoil element of claim 12 wherein the substrate comprises a CMC.

14. The turbomachine airfoil element of claim 13 wherein the CMC of the substrate and the CMC of the ribs each comprises:
a silicon-based matrix; and
silicon-based fibers embedded in the matrix.

15. The turbomachine airfoil element of claim 12 wherein the CMC comprises:
a silicon-based matrix; and
silicon-based fibers embedded in the matrix.

16. The turbomachine airfoil element of claim 1 further comprising:
a coating over the ribs and extending beyond the ribs.

17. A turbomachine including a stage of the turbomachine airfoil elements of claim 1, the turbomachine airfoil elements being blades, and the turbomachine further comprising:
a blade outer airseal adjacent tips of the blades.

18. A method for using the turbomachine airfoil element of claim 1, the method comprising:
- running a stage of said turbomachine airfoil elements forming a blade stage; and
- the ribs diverting gas flow along the pressure sides relatively toward the respective trailing edges and away from the respective tips.

\* \* \* \* \*